United States Patent
Bewermeyer et al.

(10) Patent No.: US 11,480,093 B1
(45) Date of Patent: Oct. 25, 2022

(54) VALVE AND FLUID TANK FOR A FLUID SYSTEM, AND A FLUID SYSTEM FOR A VEHICLE

(71) Applicant: Hella GmbH & Co. KGaA, Lippstadt (DE)

(72) Inventors: Frank Bewermeyer, Bueren (DE); Benjamin Grothe, Wickede (DE); Dominik Niess, Lippstadt (DE); Sebastian Tiemeyer, Dortmund (DE); Finn Malte Fischer, Aachen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/732,261

(22) Filed: Apr. 28, 2022

(30) Foreign Application Priority Data

Apr. 28, 2021 (DE) ...................... 10 2021 110 941.8

(51) Int. Cl.
  *F01P 7/14* (2006.01)
  *F01P 11/04* (2006.01)
  *F01P 11/02* (2006.01)

(52) U.S. Cl.
  CPC ............... *F01P 7/14* (2013.01); *F01P 11/029* (2013.01); *F01P 11/04* (2013.01); *F01P 2007/146* (2013.01)

(58) Field of Classification Search
  CPC .. F01P 7/14; F01P 11/029; F01P 11/04; F01P 2007/146
  See application file for complete search history.

(56) References Cited

U.S. PATENT DOCUMENTS

| | | | | |
|---|---|---|---|---|
| 5,529,026 A | * | 6/1996 | Kurr | B60H 1/00485 123/41.1 |
| 5,617,815 A | * | 4/1997 | Spies | F16K 11/076 123/41.1 |
| 2006/0118066 A1 | * | 6/2006 | Martins | F16K 11/0856 123/41.08 |
| 2017/0016381 A1 | * | 1/2017 | Yumisashi | F16K 31/043 |
| 2021/0123374 A1 | * | 4/2021 | Geiel | F16K 11/0853 |

FOREIGN PATENT DOCUMENTS

| | | |
|---|---|---|
| CN | 201434130 Y | 3/2010 |
| DE | 202016004427 U1 | 10/2017 |
| DE | 102020115516 A1 | 12/2021 |
| JP | 2018100682 A | 6/2018 |

* cited by examiner

*Primary Examiner* — Jacob M Amick
(74) *Attorney, Agent, or Firm* — Muncy, Geissler, Olds & Lowe, P.C.

(57) ABSTRACT

A valve for a fluid system of a vehicle having a valve housing with valve housing openings, a valve body arranged so as to be rotatable about an axis of rotation, a valve seal, a valve drive, and a plurality of connecting pieces corresponding to the valve housing openings. The connecting pieces have a circular flow passage area in cross section at a free end of the respective connecting piece, and the valve housing openings, corresponding to the connecting pieces, each have a substantially rectangular cross section. The respective valve housing opening is larger than the flow passage area at the free end of the corresponding connecting piece, and the flow passage areas of the connecting pieces widen in a diffuser-like manner from the free end of the respective connecting piece to the respective corresponding valve housing opening and merge in a stepless manner into the respective valve housing opening.

10 Claims, 6 Drawing Sheets

VALVE AND FLUID TANK FOR A FLUID SYSTEM, AND A FLUID SYSTEM FOR A VEHICLE

This nonprovisional application claims priority under 35 U.S.C. § 119(a) to German Patent Application No. 10 2021 110 941.8, which was filed in Germany on Apr. 28, 2021, and which is herein incorporated by reference.

BACKGROUND OF THE INVENTION

Field of the Invention

The present invention relates to a valve for a fluid system, to a fluid tank for a fluid system, and to a fluid system of a vehicle.

Description of the Background Art

Valves and fluid tanks of this kind for fluid systems and fluid systems for vehicles are already known from the state of the art in numerous design variants. The known valves for fluid systems of vehicles comprise a valve housing with a plurality of valve housing openings, a valve body arranged in the valve housing so as to be rotatable about an axis of rotation and having at least one flow-conducting connecting channel for the flow-conducting connection of at least two valve housing openings of the plurality of valve housing openings, a valve seal arranged between the valve housing and the valve body and having valve seal openings corresponding to the valve housing openings, a valve drive for the automatic rotation of the valve body about the axis of rotation, and a plurality of connecting pieces, corresponding to the valve housing openings, for the flow-conducting connection of the valve to the rest of the fluid system. The connecting pieces known in this regard from the prior art usually have a circular inner contour and a circular outer contour in cross section.

SUMMARY OF THE INVENTION

It is therefore an object of the present invention to improve a valve for a fluid system, a fluid tank for a fluid system, and a fluid system of a vehicle.

Said object is achieved by a valve for a fluid system of a vehicle, characterized in that the connecting pieces have a circular flow passage area in cross section at a free end of the respective connecting piece and the valve housing openings, corresponding to the connecting pieces, each have a substantially rectangular cross section, wherein the respective valve housing opening is larger than the flow passage area at the free end of the corresponding connecting piece, and wherein the flow passage areas of the connecting pieces widen in a diffuser-like manner from the free end of the respective connecting piece to the respective corresponding valve housing opening and merge in a stepless manner into the respective valve housing opening. Further, this problem is solved by a fluid tank for a fluid system of a vehicle having the features of claim 8 and by a fluid system of a vehicle having the features of claim 10. The vehicle can be a land vehicle designed as a motor vehicle, for example. Motor vehicles designed as an electric vehicle or a so-called hybrid vehicle are mentioned here purely by way of example. However, the invention can also be used advantageously in other land vehicles as well as in air and sea vehicles. The valve of the invention can preferably be a so-called multi-way valve. This is not necessarily the case, however. The dependent claims relate to advantageous refinements of the invention.

In particular, a significant advantage of the invention is that a valve for a fluid system, a fluid tank for a fluid system of a vehicle, and a fluid system of a vehicle are improved.

Due to the inventive design of the valve for a fluid system of a vehicle, of the fluid tank for a fluid system of a vehicle, and of the fluid system for a vehicle, the aforementioned valve, the aforementioned fluid tank, and the aforementioned fluid system for a vehicle can be realized, on the one hand, in a particularly simple manner in terms of design and production technology. On the other hand, a flow-optimized shaping of the connecting pieces and the corresponding valve housing openings is realized as a result. This is because, in contrast to the prior art, the invention makes it possible for the connecting pieces and the valve housing openings corresponding thereto to also have cross sections with non-circular inner contours. The cross sections with substantially rectangular inner contours have a clear width that is greater in each case than that of a cross section with a circular inner contour. It is thus possible according to the invention to utilize particularly well the available installation space for the valve housing openings in the valve housing. The installation space for the valve housing openings in the valve housing is severely limited circumferentially, therefore, concentrically around the axis of rotation of the valve body. Accordingly, circular valve housing openings, for example, can only be enlarged to a limited extent in order to optimize the flow through the respective valve housing opening and the connecting piece corresponding thereto. This is where the present invention provides a remedy.

In principle, the valve of the invention can be freely selected within wide suitable limits in terms of type, functioning, material, and dimensioning.

The valve housing openings, which can be substantially rectangular in cross section, can be formed at least in part, preferably all valve housing openings, in each case such that a width, extending perpendicular to the axis of rotation, of said valve housing opening is formed to be smaller than a height, extending parallel to the axis of rotation, of said valve housing opening, preferably that the width extends along the valve housing opening arranged concentrically to the axis of rotation. This significantly improves the utilization of the available installation space for the valve housing openings. This applies in particular to the preferred embodiments of this refinement.

Corners of the valve housing openings, which can be substantially rectangular in cross section, can be formed rounded. In this way, the flow through the respective valve housing opening of the valve housing is additionally improved.

The free end of at least one connecting piece can be formed as a hose connection, preferably as a coupling part of a hose coupling, very preferably as a quick coupling part. This significantly simplifies the flow-conducting connection of the valve of the invention to the rest of the fluid system. Hoses and hose couplings are standard components that are available in a wide range of designs and can be used for a large number of different applications.

The connecting pieces can be jointly formed from a single first channel shell and from a single second channel shell, wherein the first channel shell is simultaneously formed as the valve housing which is connectable to the second channel shell for forming the connecting pieces. In this way, the valve of the invention can be realized in a particularly simple manner in terms of design and production technology. Further, this enables a centralization of the components of a fluid system for a vehicle. The first and/or the second channel shell can be formed in this case as a plastic injection molded part.

The valve housing and/or the valve body can be designed to be formable such that a sealing side, facing the valve seal, of the valve housing and/or the valve body is designed to be substantially burr-free after demolding of the valve housing and/or the valve body. This ensures that the valve seal and thus the valve of the invention enable a long operating time, even without any possible costly post-processing of the aforementioned seal sides. In terms of production technology, this can be implemented, for example, in such a way that mold separation is structurally avoided in the case of the abovementioned plastic injection molded part on the sealing side of the valve housing.

The valve housing can be formed as an integral component of a fluid tank of the fluid system, preferably of a coolant tank of the vehicle for storing coolant carried in the fluid system formed as a coolant system. In this way, on the one hand, the number of fluid system components is reduced. Accordingly, the logistics, warehousing, and manufacturing of the fluid system for a vehicle are simplified. On the other hand, this enables a very compact and thus space-saving design of the fluid system.

In principle, the fluid tank of the invention for a fluid system of a vehicle is freely selectable within wide suitable limits in terms of type, functioning, material, dimensioning, and arrangement in the fluid system and the vehicle, analogously to the valve of the invention.

The tank housing can have a multi-shell design and comprises a plurality of tank housing shells, wherein one of the tank housing shells is simultaneously formed as the valve housing, preferably that the valve housing is formed as a lowest tank housing shell of the tank housing. As a result, the tank housing of the fluid tank with the valve housing integrated therein can be realized in a particularly simple manner in terms of design and production technology. This applies in particular to the preferred embodiment of this refinement. For example, the tank housing can be formed with three shells and have a topmost tank housing shell, a middle tank housing shell, and a lowest tank housing shell. This is not necessarily the case, however.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
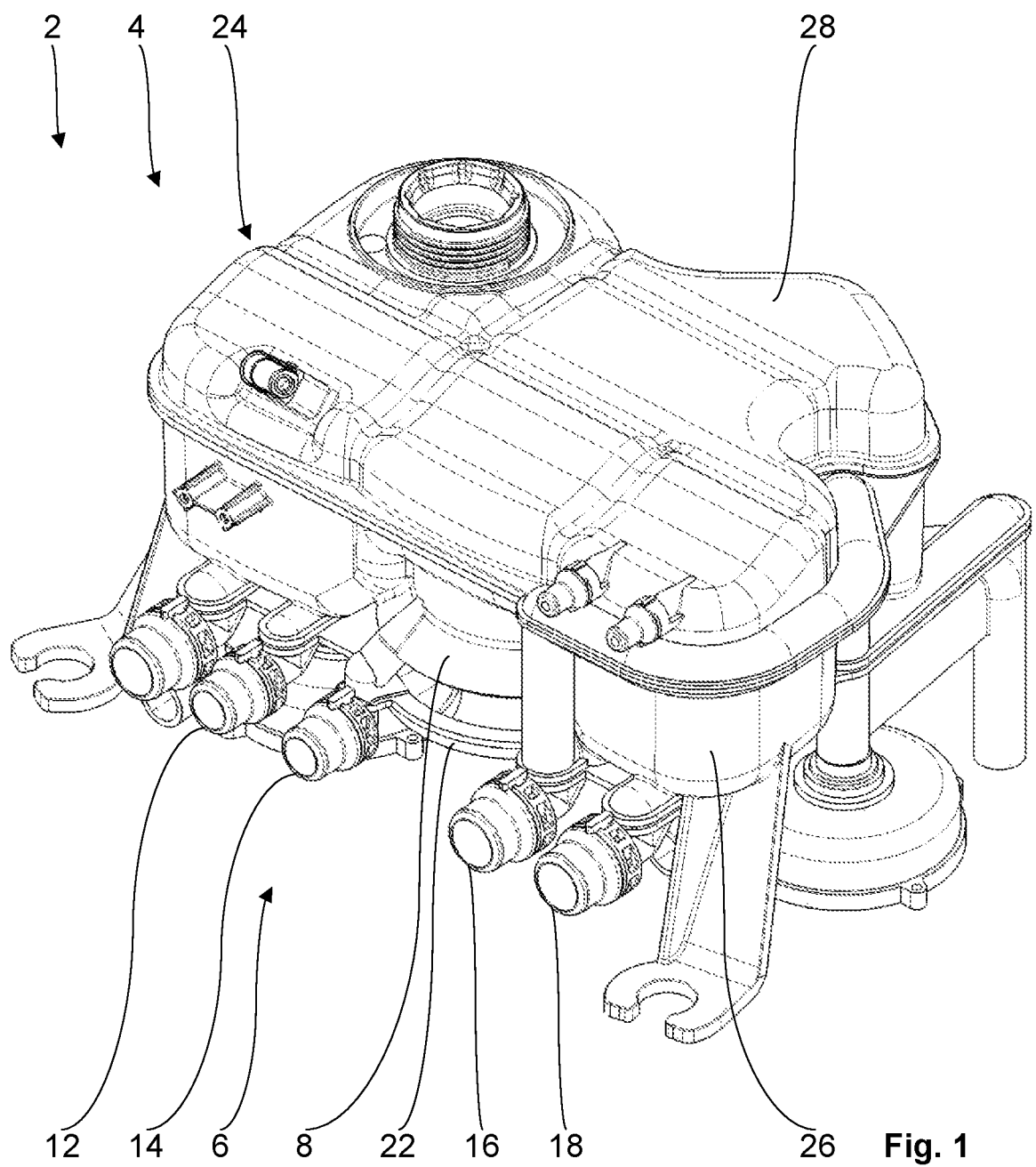
FIG. 1 shows an exemplary embodiment of a vehicle with a fluid system of the invention in a partial perspective view.

An exemplary embodiment of a vehicle with a fluid system of the invention is shown purely as an example in FIGS. 1 to 4.

The vehicle is designed here as a motor vehicle, namely, a pure electric vehicle, and is not shown in more detail.

In the present exemplary embodiment, fluid system 2 for the vehicle is formed as a coolant system for cooling the traction battery and the drive motor together with the power electronics corresponding thereto, and for cooling a refrigerant circuit for air conditioning an interior of the vehicle. The traction battery, the drive motor with the corresponding power electronics, and the refrigerant circuit of the vehicle are also not shown in detail here and are designed, for example, in a manner known per se to the skilled artisan.

Fluid system 2, formed as a coolant system, comprises a fluid tank 4, formed as a coolant tank, for storing a fluid (not shown) of the vehicle, said fluid formed as a coolant, a total of three fluid circuits which are connected in a flow-conducting manner to the fluid tank and formed as coolant circuits in which the fluid circulates, and a valve 6 connected in a flow-conducting manner, on the one hand, to the fluid circuits and, on the other hand, to the fluid tank for controlling the fluid flows of the fluid in fluid system 2, said fluid flows being formed as coolant flows. See FIG. 1 in this regard.

Valve 6 is designed here as a so-called multi-way valve and comprises a valve housing 8 with a plurality of valve housing openings, a valve body arranged in valve housing 8 so as to be rotatable about an axis of rotation 10 and having at least one flow-conducting connecting channel for the flow-conducting connection of at least two valve housing openings of the plurality of valve housing openings, a valve seal, arranged between valve housing 8 and the valve body and having valve seal openings corresponding to the valve housing openings, a valve drive for the automatic rotation of the valve body about the axis of rotation 10, and a plurality of connecting pieces 12, 14, 16, 18, 20, corresponding to the valve housing openings, for flow-conducting connection of valve 6, namely, the valve housing openings, to the rest of fluid system 2.

Figure 2:
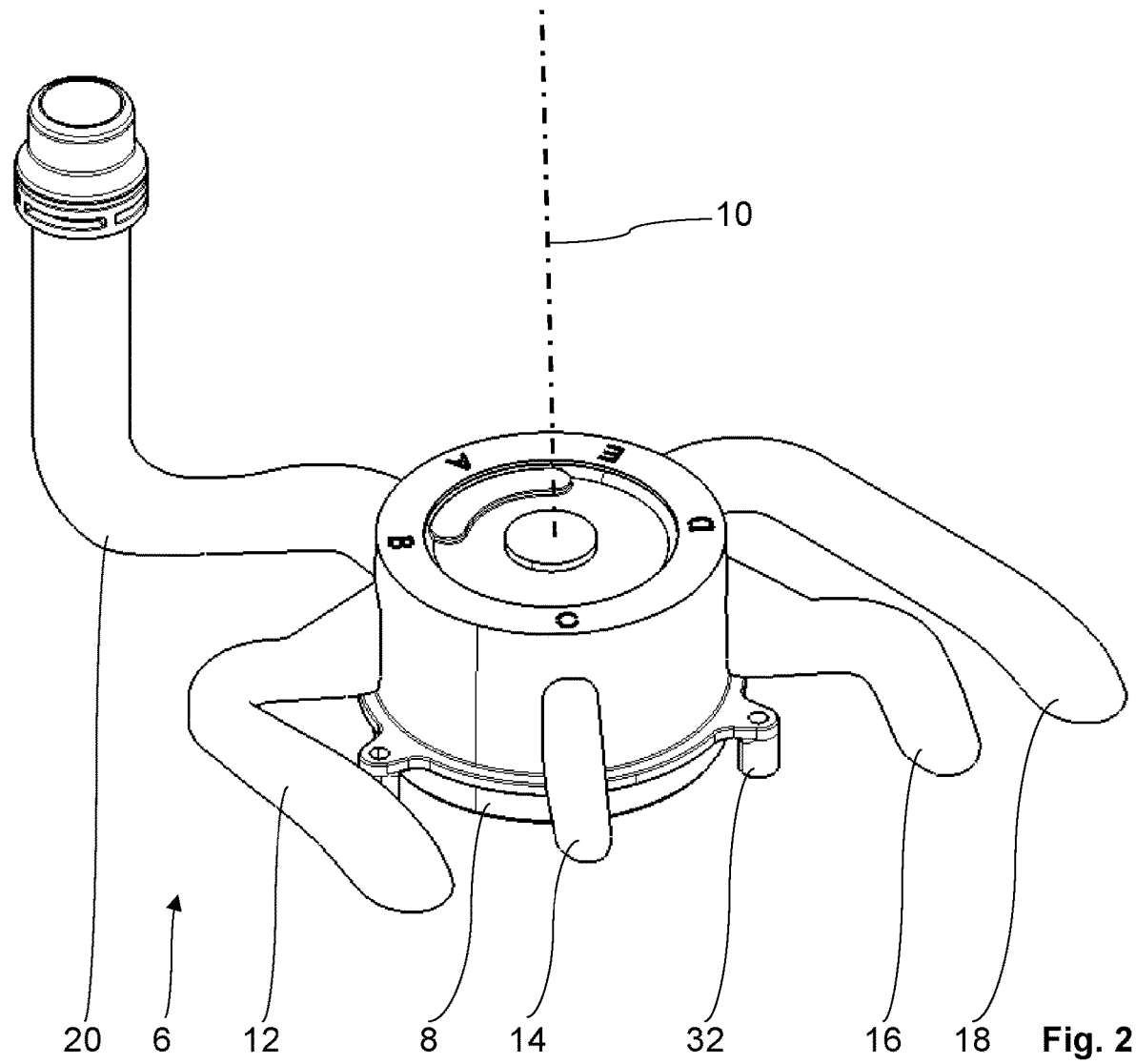
FIG. 2 shows the valve of the invention of the exemplary embodiment in a first partial perspective detail view.
Figure 3:
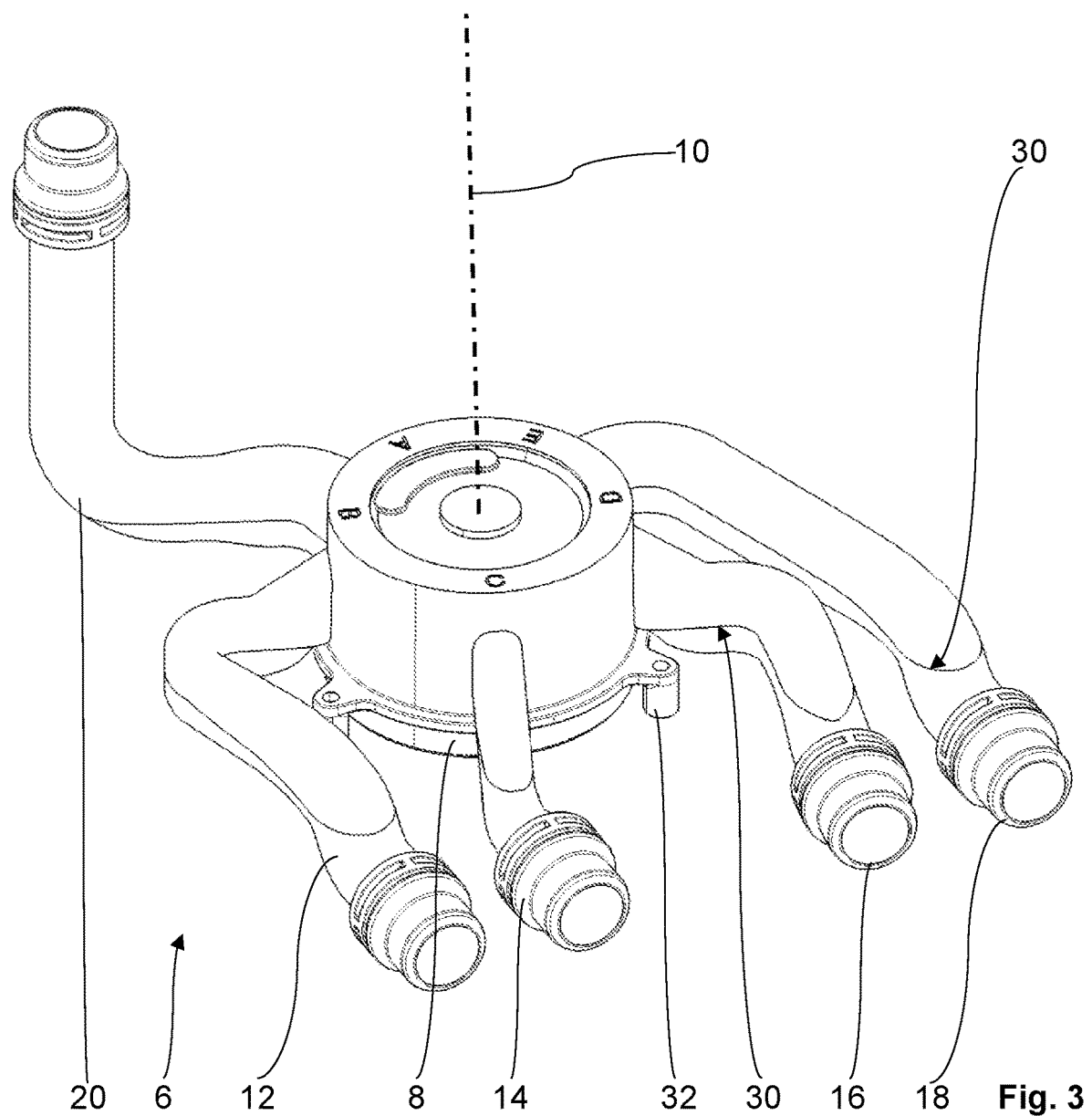
FIG. 3 shows the valve of the invention of the exemplary embodiment in a second partial perspective detail view.
Figure 4:
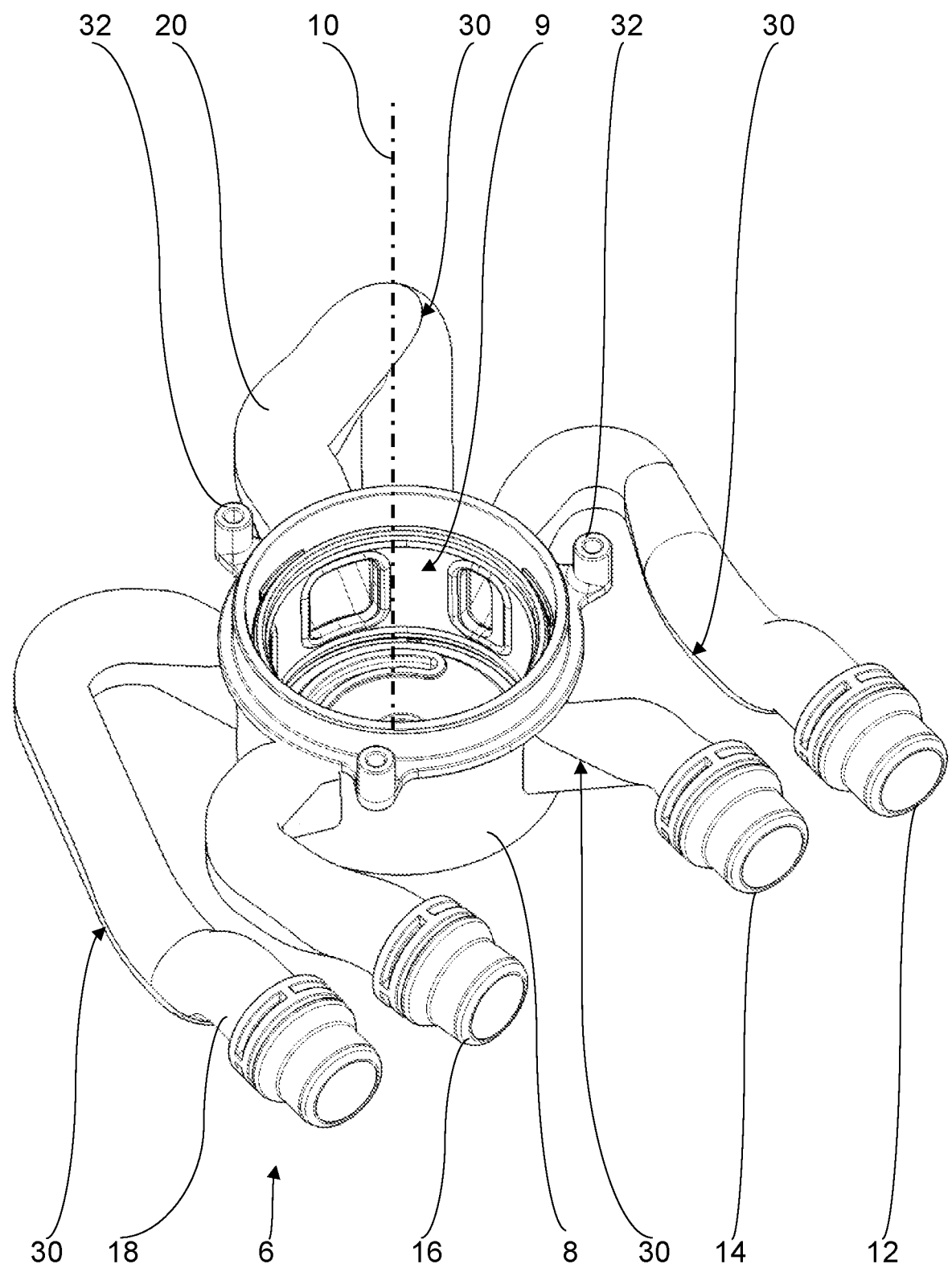
FIG. 4 shows the valve of the invention of the exemplary embodiment in a third partial perspective detail view.

The valve housing openings of valve housing 8 of valve 6 are only partially shown in FIG. 4, but are labeled in FIGS. 2 and 3 with the letters A to E drawn on valve housing 8. The valve body with the at least one connecting channel, the valve seal with the valve seal openings corresponding to the valve housing openings, and the valve drive are not shown in FIGS. 1 to 4.

In the present exemplary embodiment, connecting pieces 12, 14, 16, 18, 20 are jointly formed from a single first channel shell and from a single second channel shell 22, wherein the first channel shell is simultaneously formed as valve housing 8 which is connectable to second channel shell 22 for forming connecting pieces 12, 14, 16, 18, 20. In the present exemplary embodiment, valve housing 8, formed as a first channel shell, and second channel shell 22 are each formed as a plastic injection molded part. In this case, sliders can be used in particular in the production of valve housing 8. For the purpose of forming connecting pieces 12, 14, 16, 18, 20, the two channel shells 8, 22 are joined together by means of plastic welding. In principle, however, other connection techniques are also conceivable. Depending on the requirements of the individual case, the skilled artisan will select the appropriate connection technique for joining the two channel shells. Adhesive techniques and screw connections are only mentioned here purely as an example.

For the purpose of flow optimization, connecting pieces 12, 14, 16, 18, 20 of the present exemplary embodiment have a circular flow passage area in cross section at a free end of the respective connecting piece 12, 14, 16, 18, 20, and valve housing openings A to E, corresponding to connecting pieces 12, 14, 16, 18, 20, each have a substantially rectangular cross section, wherein the respective valve housing opening A to E is larger than the flow passage area at the free end of the corresponding connecting piece 12, 14, 16, 18, 20, and wherein the flow passage areas of connecting pieces 12, 14, 16, 18, 20 widen in a diffuser-like manner from the free end of the respective connecting piece 12, 14, 16, 18, 20 to the respective corresponding valve housing opening A to E and merge in a stepless manner into the respective valve housing opening A to E. The corners of these valve housing openings A to E, which are substantially rectangular in cross section, are rounded for the purpose of additional optimization of the flow. Refer to the valve housing openings of valve housing 8 partially visible in FIG. 4 in this regard.

Further, it can be seen from FIG. 4 that valve housing openings A to E, which are substantially rectangular in cross section, are each formed at least in part such that a width, running perpendicular to the axis of rotation 10, of this valve housing opening is formed to be smaller than a height, running parallel to the axis of rotation 10, of this valve housing opening, wherein the width extends along valve housing opening A to E arranged concentrically to the axis of rotation 10. In fact, valve housing openings A to E are only partially visible in FIG. 4. However, the valve housing openings hidden in FIG. 4 are formed analogously to the visible valve housing openings.

As can be seen in particular in FIGS. 2 to 4, connecting pieces 12, 14, 16, 18, 20 are formed here on the valve housing side at an angle to the axis of rotation 10 of greater than 0° and less than 90°, namely, from 30° to 60°, running obliquely upwards or downwards. During the production of valve housing 8, which is simultaneously formed as the first channel shell, the aforementioned sliders, which are not shown, are moved downwards at an angle, so that the curved course of connecting pieces 12, 14, 16, 18, 20, which can be seen in FIGS. 1 to 4, can be easily realized in terms of production technology in a respective section of connecting pieces 12, 14, 16, 18, 20 on the valve housing side. The free ends of connecting pieces 12, 14, 16, 18, 20 are each formed as a hose connection, namely, as a coupling part of a hose coupling, wherein the coupling is formed here as a quick coupling.

Further, in the present exemplary embodiment, valve housing 8 is designed to be formable such that a sealing side 9, facing the valve seat, of valve housing 8 is formed substantially burr-free after demolding of valve housing 8. In terms of production technology, this is implemented, for example, in such a way that mold separation is structurally avoided in the case of the abovementioned plastic injection molded part, namely, valve housing 8, on sealing side 9 of valve housing 8.

In addition, valve housing 8 is formed here as an integral part of fluid tank 4 of fluid system 2 of the vehicle, said tank being formed as a coolant tank, for storing the coolant carried in the coolant circuits. For this purpose, a tank housing 24 of fluid tank 4 is formed with three shells, wherein valve housing 8 is simultaneously formed as a tank housing shell of tank housing 24, namely, that valve housing 8 is formed as a lowest tank housing shell of tank housing 24. In addition to valve housing 8, which is formed as the lowest tank housing shell, tank housing 24 also has a middle tank housing shell 26 and a topmost tank housing shell 28. See FIG. 1 in this regard. The two tank housing shells 26, 28 are each also formed as plastic injection molded parts and, analogously to the two aforementioned channel shells 8, 22 to form connecting pieces 12, 14, 16, 18, 20, are plastic welded to one another and to valve housing 8, simultaneously formed as the lowest tank housing shell.

Accordingly, tank housing 24 of fluid tank 4, formed as a coolant tank, is here simultaneously formed as valve housing 8 for valve 6 for fluid system 2 of the vehicle. Thus, in the present exemplary embodiment, fluid tank 4, formed as a coolant tank, comprises a total of three shells, namely, the lowest tank housing shell formed simultaneously as valve housing 8 and the first channel shell, the middle tank housing shell 26 plastic welded to the lowest tank housing shell 8, and the uppermost tank housing shell 28 plastic welded to the middle tank housing shell 26. See FIG. 1 in this regard.

FIGS. 2 and 3 are purely theoretical views of the actual valve housing 8, which have been created solely for the sake of improved clarity. In reality, as explained above, valve housing 8 is an integral part of tank housing 24 of fluid tank 4. The area, as can be seen in FIGS. 2 and 3, with the letters A, B, C, D, E identifying the valve housing openings of valve housing 8, is practically formed as the lowest tank housing shell and is not merely designed to form valve housing 8 per se and the first channel shell for forming connecting pieces 12, 14, 16, 18, 20.

The vehicle with the fluid system of the invention according to the present exemplary embodiment will be explained in more detail hereinbelow with reference to FIGS. 1 to 4.

First, the individual tank housing shells, namely, valve housing 8, formed simultaneously as the first channel shell and the lowest tank housing shell, the middle tank housing shell 26, and the topmost tank housing shell 28 of tank housing 24 of fluid tank 4, as well as second channel shell 22, are each produced individually, therefore, separately from one another, as plastic injection molded parts in a manner known to the skilled artisan.

The individual tank housing shells 8, 26, 28 are then plastic welded together so that tank housing 24 of fluid tank 4 results. See FIG. 1 in this regard.

As already explained above, valve housing 8 shown in FIGS. 2 to 4, each in a detail view, is formed as an integral part of the aforementioned fluid tank 4, namely, tank housing 24.

In FIG. 2, valve housing 8, which is simultaneously formed as the first channel shell, is shown in a detail view, so that valve housing 8 according to FIG. 2 has not yet been connected to second channel shell 22.

For the purpose of forming connecting pieces 12, 14, 16, 18, 20, second channel shell 22 is now plastic welded to valve housing 8, formed simultaneously as the first channel shell. Accordingly, connecting pieces 12, 14, 16, 18, 20 result as can be seen in FIGS. 3 and 4. Seams 30 formed during the aforementioned plastic welding are clearly visible in FIGS. 3 and 4. See also FIGS. 2 to 4 in this regard, in particular FIGS. 2 and 3, in an overall view.

Finally, valve 6 is now completed by first inserting and fastening the valve seat (not shown) and then the valve body of valve 6 (also not shown) into valve housing 8 in a manner known to the skilled artisan. For example, valve 6 has an end plate (not shown) for this purpose, which closes off valve 6 at the bottom. In the present exemplary embodiment, this end plate is mechanically connected to valve housing 8 by means of three screws (not shown). See FIGS. 2 to 4 in this regard, which show a total of three screw bosses 32 of valve housing 8 for screwing in the aforementioned screws.

Due to the inventive design of the valve for a fluid system of a vehicle, of the fluid tank for a fluid system of a vehicle, and of the fluid system of a vehicle according to the present exemplary embodiment, the aforementioned valve 6, the aforementioned fluid tank 4, and the aforementioned fluid system 2 can be realized in a particularly simple manner in terms of design and production technology. Further, this enables centralization of the components of fluid system 2 for the vehicle. At the same time, a flow-optimized shaping of connecting pieces 12, 14, 16, 18, 20 and the corresponding valve openings A to E of fluid system 2 can be easily realized in terms of production technology.

Figure 5:
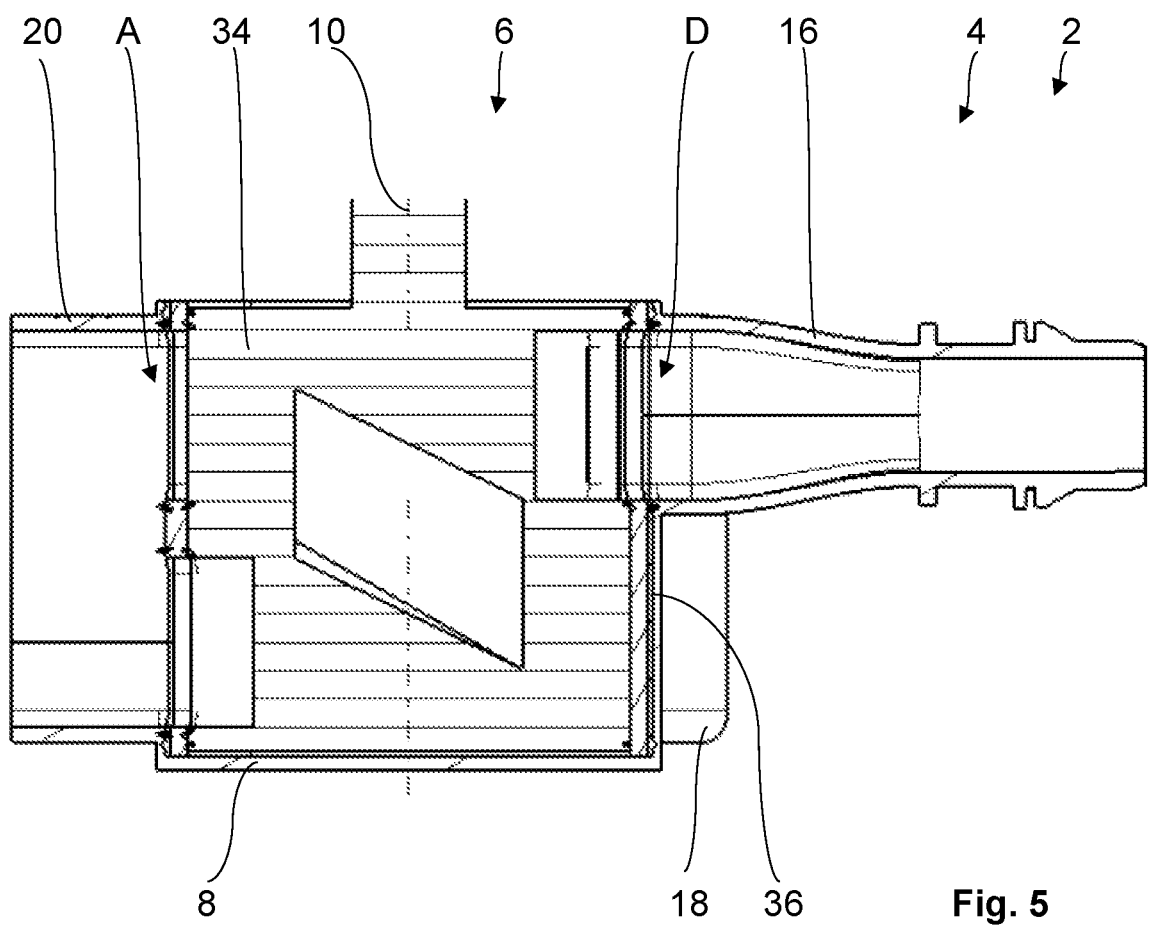
FIG. 5 shows an exemplary embodiment of a vehicle with a fluid system of the invention in a partial sectional side view.
Figure 6:
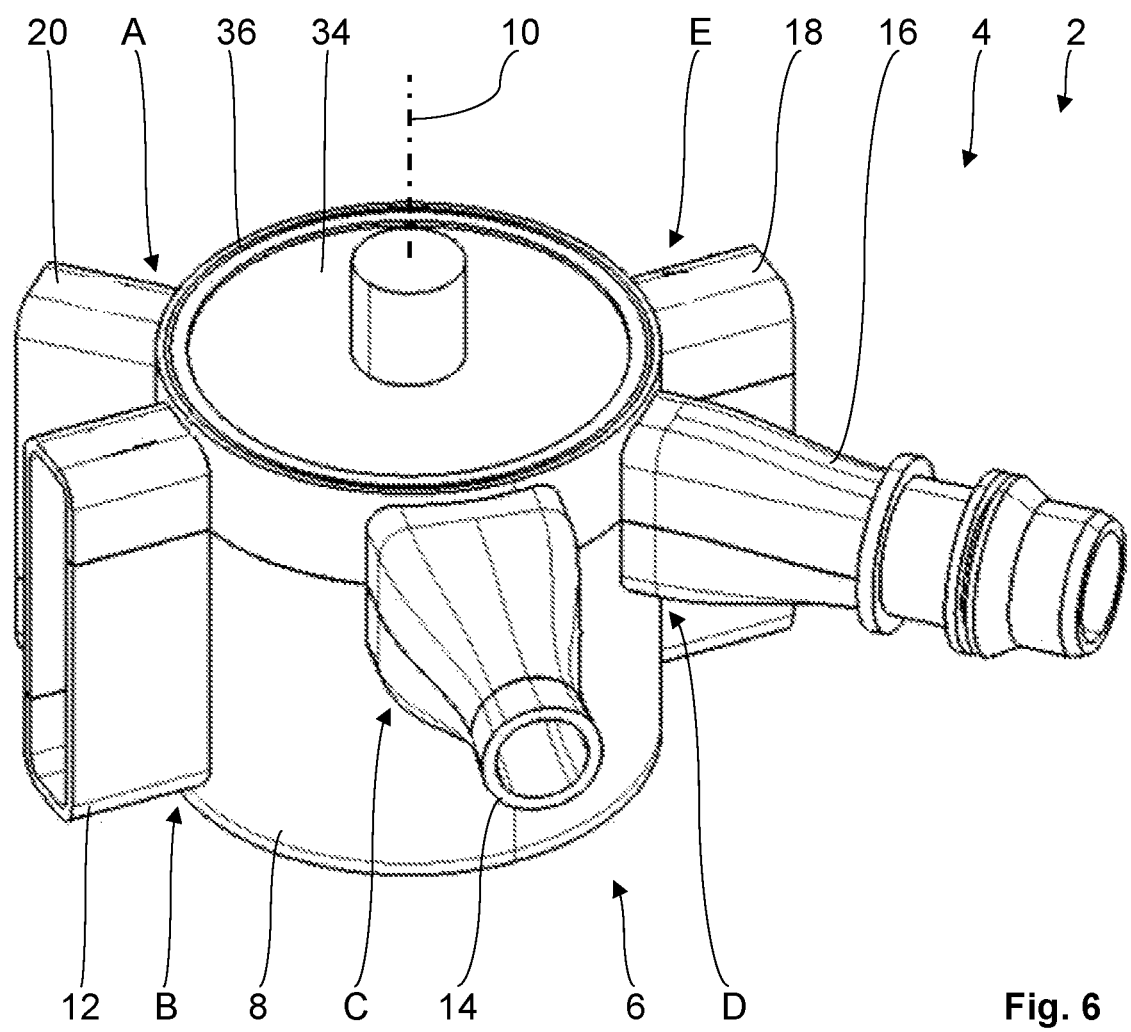
FIG. 6 shows the exemplary embodiment in a partial perspective view.

In FIGS. 5 and 6, a second exemplary embodiment of the fluid system of the invention is partially shown. The second exemplary embodiment is briefly explained here only to the extent of the differences from the first exemplary embodiment. Otherwise, reference is made to the above remarks on the first exemplary embodiment. The same or identically acting components are provided with the same reference characters.

In contrast to the first exemplary embodiment, valve body 34, arranged so as to be rotatable about the axis of rotation 10, and valve seal 36 are also shown in the second exemplary embodiment. In the second exemplary embodiment, on the one hand, connecting pieces 12, 14, 16, 18, 20 are only partially shown. On the other hand, the diffuser-like and thus stepless transition from the circular flow passage area at the free end of the respective connecting piece 12, 14, 16, 18, 20 to the substantially rectangular cross section of valve housing opening A to E corresponding thereto can be seen very well in FIGS. 5 and 6 of the second exemplary embodiment. The illustration of the second exemplary embodiment in FIGS. 5 and 6 is greatly simplified for the sake of clarity. In reality, the second exemplary embodiment corresponds substantially to the first exemplary embodiment explained in detail above.

The invention is not limited to the present exemplary embodiments. For example, the invention can also be used advantageously in other types of vehicles. This applies not only to land vehicles, but also to air and sea vehicles. Also see the introduction to the description in this regard.

In particular, the invention is not limited to the design and production details of the exemplary embodiments. For example, the number of connecting pieces and of the corresponding valve housing openings and valve seal openings is not limited to the respective number in the exemplary embodiments, but can be freely selected within technical limits depending on the requirements of the individual case. The same applies to the spatial arrangement of the individual connecting pieces, which can also be freely selected depending on the spatial conditions of the respective application.

It is also conceivable that the tank housing is only formed from two tank housing shells. However, any other reasonable number of tank housing shells is also possible in principle.

In contrast to the present exemplary embodiments, the valve can also be attached only to the tank, namely, the tank housing, by means of its valve housing. Accordingly, integration of the valve housing into the tank housing is not absolutely necessary. Further, the valve can also be attached to other suitable components of the vehicle, such as a body or a drive motor of the vehicle.

Of course, the invention can be used advantageously not only in vehicle fluid systems formed as coolant systems. Accordingly, the invention can be used for a variety of applications different from one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A valve for a fluid system of a vehicle, the valve comprising:
    a valve housing with a plurality of valve housing openings;
    a valve body arranged in the valve housing so as to be rotatable about an axis of rotation;
    at least one flow-conducting connecting channel for a flow-conducting connection of at least two valve housing openings of the plurality of valve housing openings;
    a valve seal arranged between the valve housing and the valve body and having valve seal openings corresponding to the valve housing openings;
    a valve drive for an automatic rotation of the valve body about the axis of rotation;
    a plurality of connecting pieces corresponding to the valve housing openings for the flow-conducting connection of the valve to a fluid system,
    wherein the connecting pieces have a circular flow passage area in cross section at a free end of the respective connecting piece,
    wherein the valve housing openings, corresponding to the connecting pieces, each have a substantially rectangular cross section,
    wherein the respective valve housing opening is larger than the flow passage area at the free end of the corresponding connecting piece, and
    wherein the flow passage areas of the connecting pieces widen in a diffuser-like manner from the free end of the respective connecting piece to the respective corresponding valve housing opening and merge in a stepless manner into the respective valve housing opening.

2. The valve according to claim 1, wherein the valve housing openings, which are substantially rectangular in cross section, are formed at least in part such that a width extending substantially perpendicular to the axis of rotation of the valve housing opening is formed to be smaller than a height extending substantially parallel to the axis of rotation of the valve housing opening such that the width extends along the valve housing opening arranged concentrically to the axis of rotation.

3. The valve according to claim 1, wherein the corners of the valve housing openings, which are substantially rectangular in cross section, are formed rounded.

4. The valve according to claim 1, wherein the free end of at least one connecting piece is formed as a hose connection or as a coupling part of a hose coupling or as a quick coupling part.

5. The valve according to claim 1, wherein the connecting pieces are jointly formed from a single first channel shell and from a single second channel shell, wherein the first channel shell is formed as the valve housing which is connectable to the second channel shell for forming the connecting pieces.

6. The valve according to claim 1, wherein the valve housing and/or the valve body are/is designed to be formable such that a sealing side, facing the valve seal, of the valve housing and/or of the valve body is substantially burr-free after demolding of the valve housing and/or the valve body.

7. The valve according to claim 1, wherein the valve housing is formed as an integral component of a fluid tank of the fluid system or of a coolant tank of the vehicle for storing coolant carried in the fluid system formed as a coolant system.

8. A fluid tank for a fluid system of a vehicle, the fluid tank comprising:
- a tank housing for storing a fluid of the vehicle, wherein the tank housing is formed as a valve housing for a valve for the fluid system of the vehicle, and wherein the valve is formed according to claim 1.

9. The fluid tank according to claim 8, wherein the tank housing has a multi-shell design and has a plurality of tank housing shells, wherein one of the tank housing shells is formed as the valve housing or the valve housing is formed as a lowest tank housing shell of the tank housing.

10. A fluid system of a vehicle, the system comprising:
- a fluid tank for storing a fluid of the fluid system;
- at least one fluid circuit that is connected in a flow-conducting manner to the fluid tank and in which the fluid circulates; and
- a valve connected in a flow-conducting manner to the fluid circuit and/or to the fluid tank to control at least one fluid flow of the fluid in the fluid system, the valve being formed according to claim 1.

\* \* \* \* \*